March 15, 1938.   W. O. LYTLE   2,110,885
GLASS BRICK WALL
Filed Oct. 31, 1936
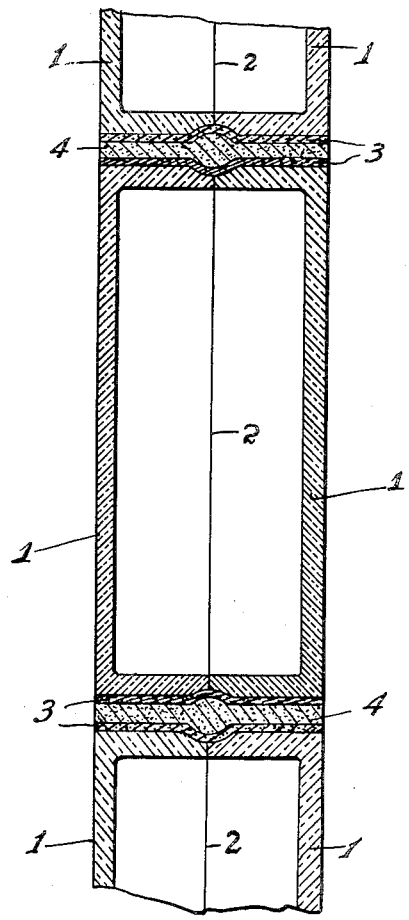
INVENTOR.
WILLIAM O. LYTLE
BY Bradley T Bell
ATTORNEYS.

Patented Mar. 15, 1938

2,110,885

UNITED STATES PATENT OFFICE 2,110,885

GLASS BRICK WALL

William O. Lytle, New Kensington, Pa., assignor to Pittsburgh Plate Glass Company, Allegheny County, Pa., a corporation of Pennsylvania Application October 31, 1936, Serial No. 108,626

1 Claim. (Cl. 72—41)

The invention relates to a glass brick wall. Glass bricks are formed into a wall and bonded by the use of ordinary cement mortar prepared from Portland cement and similar to that used with ordinary building brick, but heretofore great difficulty has been encountered in securing a proper bond under varying temperature conditions, as the adherence of the mortar to a glass surface is very insecure as compared with its adherence to a clay brick. Attempts to improve the bond have been made by roughening and recessing the edges of the bricks and by the use of sanded cement, but these expedients involve considerable expense and are only partially effective in securing an adequate bond. The main object of the present invention is to provide means on the edges of the bricks at a very low cost which will give an adequate bond with mortar or plaster and one which is comparable with that secured between mortar and clay bricks. A further object is the provision of a bond of the character specified which is permanent and which remains secure under the most extreme temperature conditions to which the wall made up of the glass bricks may be exposed. One embodiment of the invention is shown in the accompanying drawing, wherein:

The figure is a section through a wall formed of the bricks provided with the improved bonding material.

Referring to the drawing, each brick comprises a pair of sections 1, 1 of conventional design welded or otherwise rigidly secured together at their edges and sealed along the line 2. Each brick has on its edge surface a thin layer 3 of bonding material securely adherent to the glass and of such character that it will adhere very firmly to ordinary cement mortar or plaster, and 4 are layers of mortar lying between the layers 3.

The material of which the layer 3 is composed is one of the vinyl resins, more specifically and preferably polymerized vinyl acetate. The resin is dissolved in a suitable quick drying solvent, such as cellosolve, and applied to the edges of the brick by spraying or brushing. A proper proportion of resin to solvent is 120 pounds of the vinyl acetate to 90 gallons of the cellosolve. The coating dries quickly and can be applied at a very low cost as compared with the roughening and sanding expedients heretofore employed, and gives a more secure bond under the service conditions to which the brick is exposed. As compared with blocks without the coating, the vinylite coated blocks show a 50 per cent increase in bond strength and approximately a 200 per cent increase in strength after temperature cycling tests covering a range from minus 20 degrees F. to 120 degrees F. The bond is of such strength that any failure occurs in the cement itself rather than in the attachment of the glass to the resin or in the attachment of the resin to the cement. These improved results are believed to be due to the elasticity of the resin under wide temperature changes, its capacity to resist water absorption, and its characteristic of high adherence to both glass and cement.

The coating is subject to modification by the addition of a filler, such as whiting, silica, or other finely divided neutral material to provide a heavier film or to cheapen the coating. Other vinyl resins may be used in place of the vinyl acetate, such as one of the vinyl acetal resins, or vinyl cloracetate or mixtures of two or more of the resins. Similarly various other solvents than the cellosolve may be employed for the various resins, these being well known to those skilled in the art. In most cases, it will be found desirable to heat the bricks after the application of the coating, particularly in cases where the polymerization is not complete, in order to add to the water resistance of the coating or to speed up the removal of the solvent and insure its complete removal. Solvents, such as cellosolve, are water soluble and the retention in the resin of these solvents will impair the permanency of the bond and render the bond more liable to failure when exposed to moisture. As an alternative to the step of heating the bricks after the application of the resin, they may be brought to a relatively high temperature before applying the resin, in which case, the transfer of heat from the bricks to the resin, will accomplish the rapid removal of solvent and a further polymerization of the resin.

What I claim is:

A glass brick wall comprising glass bricks in abutting relation at their edges with each of such edges coated with a layer of polymerized vinyl resin substantially free from solvent and a layer of mortar between each opposing pair of coated edges.

WILLIAM O. LYTLE.